United States Patent [19]

Van Iseghem

[11] Patent Number: 4,681,797
[45] Date of Patent: Jul. 21, 1987

[54] THERMOFORMABLE, MULTI-LAYER PLASTIC SHEET HAVING GAS BARRIER PROPERTIES

[75] Inventor: Augustinus E. M. Van Iseghem, St-Niklaas, Belgium

[73] Assignee: Cobelplast N.V.S.A., Lokeren, Belgium

[21] Appl. No.: 777,797

[22] Filed: Sep. 19, 1985

[30] Foreign Application Priority Data

Sep. 26, 1984 [DE] Fed. Rep. of Germany ....... 3435233

[51] Int. Cl.⁴ ................................................ B32B 7/02
[52] U.S. Cl. .................................... 428/212; 428/349; 428/516; 428/517; 428/518; 428/522; 428/520; 156/245
[58] Field of Search ............... 428/516, 517, 349, 518, 428/522, 520, 212; 156/245

[56] References Cited

U.S. PATENT DOCUMENTS 3,673,050  6/1972  Newman et al. ............... 428/517
4,532,189  7/1985  Mueller ........................ 428/516
4,567,090  1/1986  Ohya et al. ................... 428/522

Primary Examiner—Edith Buffalow
Attorney, Agent, or Firm—Paul Shapiro

[57] ABSTRACT

A thermoformable, multi-layer plastic sheet with gas barrier properties is disclosed having an inner gas barrier layer, a glue layer applied to either side of the gas barrier layer and layers of a polyolefin composition bonded to the glue layers. To increase the tensile strength of the sheet during heating for the purpose of thermoforming, a second polyolefin layer is bonded to at least one of the two polyolefin layers, the second polyolefin layer having a lower melt index than the layer of the polyolefin composition beneath it.

7 Claims, 1 Drawing Figure

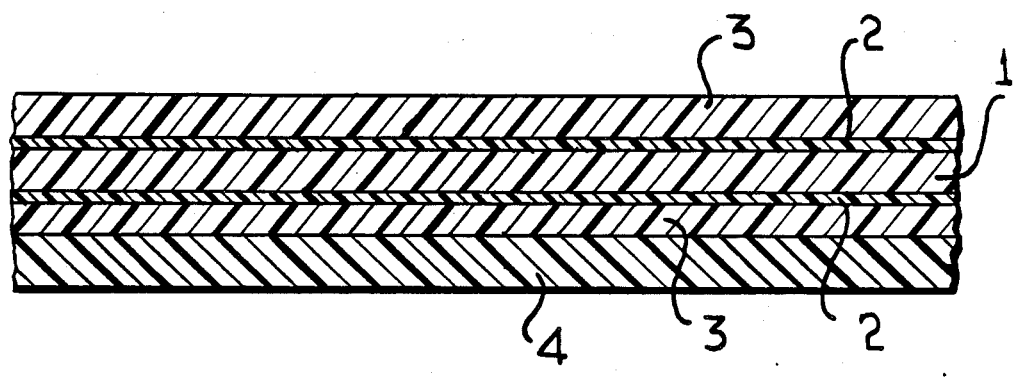

THERMOFORMABLE, MULTI-LAYER PLASTIC SHEET HAVING GAS BARRIER PROPERTIES

BACKGROUND TO INVENTION

1. Field of the Invention

This invention relates to a thermoformable, multi-layer plastic sheet with gas barrier properties, the sheet having an inner extrudable gas barrier layer, a glue layer applied to either side of the gas barrier layer, each of the glue layers having a layer of a polyolefin composition bonded to it.

2. The Prior Art

Thermoformable, multi-layer plastic sheets with gas barrier properties are know to the art for the packaging of oxygen and water vapor-sensitive products (British Pat. No. 1,379,106). The plastic sheet is a coextruded sheet, the inner extrudable barrier layer of which consists of a vinylidene chloride/vinyl chloride copolymer, with glue layers of ethylene/vinyl acetate copolymer applied to either side of an outer layer of polyethylene, polypropylene or ethylene/propylene copolymer. Such plastic sheets are suitable for the packaging of products containing volatile flavor which is to be retained to the largest possible extent, as well as for products which may pick up undesirable odors from the environment, or for products containing highly volatile components. Products which may be advantageously packed in such sheets are, for instance, cheese, butter, various medicines, dried food products and shelf-stable meat products.

The known multi-layer sheets of suitable thickness can be converted to comparatively rigid plastic packages using thermoplastic forming techniques. In thermoforming, the multi-layer sheet material is formed under the effect or heat by drawing the sheet web from a reel, holding the lateral edges of the sheet in suitable conveyor means and passing it through a heat-treating zone. The heating can be effected by an oven or by radiant heaters of by contact heating. The sheet so heated is fed directly into a thermoforming machine in which the forming operation is effected, for example by vacuum forming, pressure forming or a similar treatment, in order to adapt the package to be manufactured to the item to be packed. In all cases the sheet material must be heated so that a certain degree of softening is accomplished before it can be converted to the particular shape desired.

A drawback in the thermoforming of multi-layer sheets of the type described above in which the outer layers are formed of a polyolefin composition is the relatively high melt index of this polyolefin composition which, on the other hand, is required for coextrusion with the high density materials of which the gas barrier layers of the type described above are composed. Due to the fact that polyolefins, such as polyethylene, polypropylene or propylene copolymers, have a relatively sharply defined melting point, such sheets, when heated outside the forming station to a temperature adequate for thermoforming, often cannot absorb the tensile forces created by their own weight without noticeable elongation. Therefore the sheets, when passing through the heating station while being supported by the feed chains, very often sag and have to be fed into the forming machine in this condition. Such sagging sheets lead to excessive sheet material being fed to the individual mold cavities in the thermoforming machine, which results in wrinkles or cracks of the packages so manufactured making them unsuitable for the intended purpose.

SUMMARY OF THE INVENTION

The present invention is based on designing a plastic sheet of the type described above such that the sheet, when heated as required for the manufacture of the package, retains such a tensile strength that sagging of the sheet under its own weight is avoided or at least limited to such an extent that the sagging will not have a detrimental effect during further conversion of the heated sheet in the thermoforming machines.

To solve the above problem, the aforementioned thermoformable, multi-layer plastic sheet in accordance with the invention is characterized by at least one of the two polyolefin layers being bonded to a second polyolefin layer having a lower melt index than the polyolefin composition of the layer underneath.

Surprisingly, it has been found that the second polyolefin layer, which is applied to at least one side of the known five-layer plastic sheet, in spite of its lower melt index causes a stabilization of said sheet during heating to forming temperature, so that a higher thermal strength of the plastic sheet is accomplished.

DETAILED DESCRIPTION OF THE INVENTION

The second polyolefin layer which is applied to one or to both sides of the known multi-layer plastic sheet should advisably be of the same composition as the polyolefin composition beneath it, to which the second layer is bonded.

The second polyolefin layer may be applied to the layer of the polyolefin composition, which may be the lower layer, either directly by heating, possibly by using the extrusion heat, or by bonding it to said layer of the polyolefin composition by means of an isocyanate-based glue.

It is expedient for the layer of the polyolefin composition, which may be the lower layer, to have a melt index (ASTM D-1238-Condition L) of about 1.5 to 10 g/min at 230° C.

The melt index, as specified in accordance with ASTM Test D-1238-Condition L, means that the mass extrudes through an orifice of 0.2095 cm and 0.8 cm length in a "dead-weight piston plastometer" under the weight of a piston having a diameter of 0.947 cm and weighing, in combination with its plunger, 2,160 g is determined in 10 g/min at the stated temperature of the polyolefin composition.

A propylene block polymer, which is commercially available under the trade mark "BASF 2 300 KX" and has a melt index of 4 g/min at 230° C. has proved to be particularly suitable for use as the lower layer of the polyolefin composition.

A polypropylene copolymer, which is commercially available from the Hercules Company under the trade mark "PROFAX PD 191" and has a melt index of about 0.8 g/min at 230° C., has proved to be particularly suitable and expedient for the outer layer of the polyolefin composition.

The thickness of the outer layer of the polyolefin composition may range from about 30 percent to about 6 percent of the total thickness of the sheet, preferably between about 40 and about 45 percent.

The FIGURE shows an enlarged schematic section through a thermoformable multi-layer plastic sheet in accordance with the invention.

In the FIGURE, (1) identifies the inner barrier layer of the sheet which, for example, may consist of an extrudable vinylidene chloride polymer or an ethylene/vinyl/alchohol copolymer. To this inner layer, which has a thickness of about 5 to 15 percent of the total thickness of the multi-layer sheet, glue layers (2) are bonded which, in the illustrated example, consist of an ethylene/vinyl acetate copolymer, both of which are covered by a layer (3) of a polyolefin composition, for example of a propylene block polymer.

To the lower layer (3) in the FIGURE, there is bonded layer (4) comprised of a polyolefin composition, for example, of a polypropylene copolymer having a lower melt index than layer (3). The thickness of layer (4) in the illustrated example is about 30 to about 60 percent of the total thickness of the sheet. The layers (3) and (4) may be continuously and tightly bonded to each other either directly under the effect of heat or by using an isocyanate based glue.

What is claimed is:

1. A thermoformable, multi-layer plastic sheet having gas barrier properties, the sheet comprising an inner extrudable gas barrier layer, a glue layer applied to either side of the gas barrier layer, each of the glue layers having layers of a first polyolefin composition bonded to it and at least one of the two first polyolefin layers being bonded to a second polyolfin layer which has a lower melt index than the layer of the first polyolefin composition underneath.

2. The sheet in accordance with claim 1, wherein the first polyolefin composition layer has a melt index (ASTM D-1238-Condition L) of about 1.5 to about 10 g/min at 230° C. and the second polyolefin layer has a melt index of less than 1.5 g/min at 230° C.

3. The sheet of claim 1, wherein the glue layer is comprised of an ethylene/vinyl acetate copolymer.

4. The sheet of claim 1, wherein the gas barrier layer is a vinylidene chloride polymer.

5. The sheet of claim 1, wherein the first polyolefin layer is a propylene block copolymer.

6. The sheet of claim 1 wherein the second layer is a polypropylene copolymer.

7. The sheet of claim 1, wherein each outer polyolefin layer comprises about 30 to about 60 percent of the total thickness of the sheet.

* * * * *